Patented Mar. 18, 1941

2,235,234

UNITED STATES PATENT OFFICE 2,235,234

PROCESS FOR STRIPPING DYES

Robert Wighton Moncrieff, Spondon, near Derby, England, assignor to Celanese Corporation of America, a corporation of Delaware No Drawing. Application March 17, 1939, Serial No. 262,491. In Great Britain March 30, 1938

3 Claims. (Cl. 8—81)

This invention relates to the stripping of dyestuffs from cellulose acetate textile and other materials.

It has been found that methylene chloride is a very valuable agent for use in the stripping of dyes from cellulose acetate materials, especially water-insoluble dyes and particularly those which have a direct affinity for cellulose acetate when applied thereto in the form of aqueous dispersions.

According to the present invention dyes are stripped from cellulose acetate materials by the action of a liquid comprising methylene chloride. The methylene chloride is most advantageously used diluted with a substantially water-insoluble organic liquid miscible therewith and which has substantially no swelling action on cellulose acetate or very much less swelling action than methylene chloride.

Very good liquids for stripping dyestuffs from cellulose acetate are mixtures of methylene chloride with hydrocarbons, for example aliphatic hydrocarbons, e. g. in the form of petroleum ether, petrol (gasoline) or kerosene, and aromatic hydrocarbons, e. g. benzene, toluene and xylene. Other liquids suitable as diluents for the methylene chloride are halogenated hydrocarbons having little swelling action or no substantial swelling action on cellulose acetate, for example carbon tetrachloride, trichlorethylene and perchlorethylene.

The proportion of diluent and the temperature at which the liquid is employed are preferably such that the liquid has a substantial swelling action on the cellulose acetate. Very good results can be obtained at ordinary temperatures with a mixture of methylene chloride and petrol (gasoline) containing about 55 to 75 or 80% and especially about 75% of methylene chloride. In this way very effective stripping of colour can be accomplished without damage to the material. Instead of the petrol a like proportion of another hydrocarbon or of a halogenated hydrocarbon having no substantial swelling action on the cellulose acetate can be used.

The stripping operation is conveniently carried out by immersing the material to be stripped in the methylene chloride liquid. Movement of the material in the liquid is desirable and accelerates the stripping action. Again, the methylene chloride liquid may be circulated through the cellulose acetate material in a suitable container.

Two or more treatments with the methylene chloride liquid may be given, according to the depth of the colour on the material and the degree of stripping required. After the stripping operation proper it is advantageous to wash the material with a water-insoluble liquid having substantially no swelling action on the material in order to free it from methylene chloride. For this purpose it is very convenient to use the diluent employed in the stripping mixture. For example, after stripping with a mixture of petrol and methylene chloride the material can be washed with petrol alone.

Various cellulose acetate textile materials may be stripped in accordance with the invention. For instance the process may be applied to ordinary dry-spun cellulose acetate artificial silk or to wet-spun cellulose acetate artificial silk. Again, the process can be used with cellulose acetate artificial silk which has been stretched in the presence of an organic softening agent as described in U. S. Patent No. 1,709,470 and British Patent No. 323,790 or in the presence of steam or hot water, as described in U. S. Patents Nos. 2,142,721, 2,142,722 and 2,142,909. Again, cellulose acetate materials which have first been stretched and then shrunk, e. g. in the manner described in U. S. Patent No. 2,058,422 may be treated in accordance with the invention. Other materials which can be treated are formed cellulose acetate filaments which have been esterified, for example in the manner described in U. S. applications S. Nos. 39,288, 39,289, now Patent No. 2,159,011, and 39,290, now Patent No. 2,159,012, all filed on September 5, 1935. The new process can also be used to strip cellulose acetate in other forms, for example cellulose acetate straw, foil or film.

As mentioned above, the methylene chloride liquids are very effective agents for stripping from cellulose acetate water-insoluble dyes having direct affinity for the material when applied in the form of aqueous dispersions. Examples of such dyestuffs are 2:4-dinitro-4'-amino-diphenylamine, 4-chlor-2 - nitro - 4' - methyl-diphenylamine, the azo dye from diazotised 5-nitro-2-amino-anisole and dimethyl aniline or diethyl aniline, 1-oxy-4-amino-anthraquinone and 1-oxy-4-methylamino-anthraquinone.

The dye stripped from the materials may very readily be recovered from the stripping liquids by distillation of the latter. Steam distillation is particularly effective as by this means a fine suspension of the dye in water is obtained. If desired, the greater part of the methylene chloride liquid may be removed by ordinary distillation and the remainder by steam distillation.

Cellulose acetate materials from which dyes have been removed by the process of the invention can be redyed as desired. By reason of the very complete stripping which is possible redyeing in light shades can be accomplished.

The invention is illustrated by the following example:

Example

Cellulose acetate yarn dyed with 1-oxy-4-amino-anthraquinone or 2:4-dinitro-4'-amino-diphenylamine is immersed in 20 to 30 times its weight of a mixture of petrol and methylene chloride containing about 75% of the latter. The temperature of the liquid is about 15° C. and the yarn is moved about in it for 5 to 10 minutes. This treatment is repeated with a second quantity of liquid and finally the yarn is rinsed twice in petrol alone to remove methylene chloride. A very complete stripping of the dyestuff is thus effected.

Having described my invention, what I desire to secure by Letters Patent is:

1. Process for the stripping of water-insoluble dyes from cellulose acetate materials, which comprises subjecting the materials to the action of a mixture of petrol and methylene chloride containing about 75% of the latter.

2. Process for the stripping of water-insoluble dyes from cellulose acetate materials, which comprises subjecting the materials to the action of a swelling liquid comprising a mixture of methylene chloride with a hydrocarbon, containing from 55 to 80% of the former.

3. Process for the stripping of water-insoluble dyes from cellulose acetate materials, which comprises subjecting the materials to two successive treatments each of about five to ten minutes duration at about 15° C. with a mixture of petrol and methylene chloride containing about 75% of the latter.

ROBERT WIGHTON MONCRIEFF.